July 28, 1925.

C. STEENSTRUP

STEAM PLATE

Filed March 30, 1923

Inventor:
Christian Steenstrup,
by
His Attorney.

Patented July 28, 1925.

1,547,840

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

STEAM PLATE.

Application filed March 30, 1923. Serial No. 628,930.

*To all whom it may concern:*

Be it known that I, CHRISTIAN STEENSTRUP, a citizen of the United States, residing at Schenectady, in the county of Schenectady, State of New York, have invented certain new and useful Improvements in Steam Plates, of which the following is a specification.

The present invention relates to steam plates or tables such as are commonly used in hydraulic presses to consolidate materials of various kinds to form sheets.

The necessary and desirable qualities of such a plate are that it shall have flat, true surfaces which are free from all imperfections; that it be strong so as not to collapse even when subjected to heavy pressure; that it be relatively cheap to construct; that there be good thermal conductivity between the fluid-containing passages and the outer surfaces; that it be thin so as to permit of mounting a relatively large number in a given press at the same time; that it be capable of being rapidly heated and cooled, and that it remain true while in use and especially when alternately subjected to heat and cold.

I have invented or discovered a plate or table which fulfills the above-mentioned qualities. For a consideration of what I believe to be novel and my invention, attention is directed to the accompanying description and the claims appended thereto.

Figure 1:
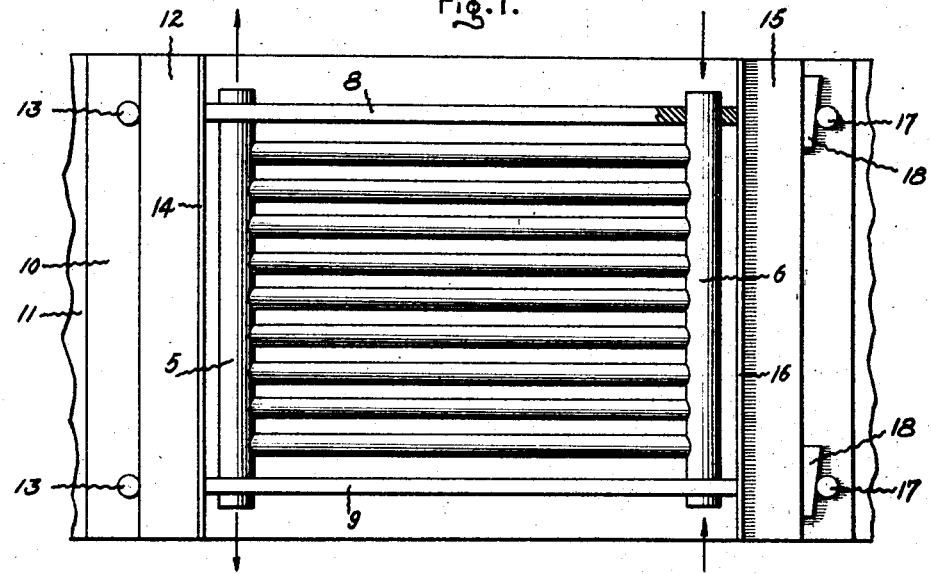
Figure 2:
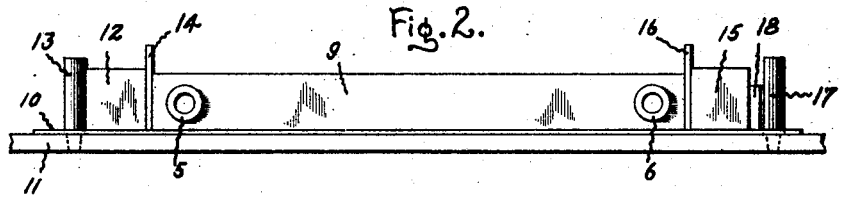
Figure 3:
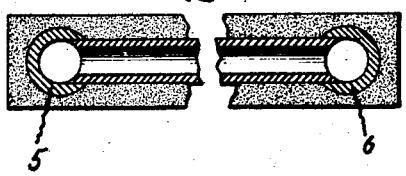
Figure 4:
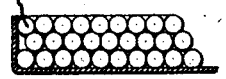

In the attached drawing, Fig. 1 is a plan view of a steam plate in the process of construction; Fig. 2 is an edge view of the same; Fig. 3 is a partial section of a complete plate, and Fig. 4 is a detail view on an exaggerated scale of the steel shot used in the composite metal backing or support.

In Fig. 1 is shown the means employed in constructing the plate. I first construct the parts through which the heating and cooling fluid alternately passes. These comprise a pair of conduits or manifolds 5 and 6 which are made of ordinary steel pipe or tubing. These pipes are drilled on one side to receive as many smaller steel cross-pipes or conduits as are desired. These pipes have an external diameter which is approximately the same as the internal diameter of the manifolds as best shown in Fig. 3. The ends of each pipe instead of being cut off square are cut away on the arc of a circle, the diameter of which corresponds to that of the bore of the manifolds. The purpose of this is to avoid restrictions to the flow of fluid in the manifolds and to give them a smooth interior to the end that the circulating fluid will freely flow. When made in quantities the manifolds will be put in a fixture and drilled in a multiple drilling machine, so that the holes will be uniformly spaced and all in the same plane. The cross-pipes are all of the same length and the ends are shaped as above stated. The cross-pipes are first placed in a fixture to hold them in their proper relation one to the other after which the manifolds are placed in position and moved toward each other to force them over the ends of the pipes. The holes in the manifolds are of such size that the ends of the pipes will make friction fits with the walls thereof; no attempt, however, is made to make them fluid-tight for reasons that will appear later. Owing to the fact that the pipes are round it is evident that they will withstand very heavy pressures without collapsing. After the manifolds and pipes are assembled a pair of relatively thin plates 8 and 9 are mounted in position as shown, said plates having openings to receive the projecting ends of the manifolds. These plates in addition to holding the ends of the manifolds cooperate with them to form means for supporting the built-up structure in spaced relation to the top and bottom surfaces of the finished plate. The fluid-circulating structure thus built up is then mounted on a sheet of asbestos 10 which in turn is supported on a steel supporting plate 11 of suitable thickness. At one end of the supporting plate is located a block of steel 12 which is held in position by a pair of pins 13 or equivalent means. Situated at one side of the block and between it and said built-up structure is a vertically-disposed sheet of asbestos 14. At the opposite end of the supporting plate is a similar block 15 and between it and said built-up structure is a vertically-disposed sheet of asbestos 16. The block 15 may be held in adjusted position by the pins 17 and wedges 18 or equivalent means. By reason of this arrangement the side members 8 and 9 are firmly held in position. It will thus be seen that a container has been formed of which the sheet of asbestos 10 and plate 11 form the bottom, the plates 8 and 9 the sides, and the sheets of asbestos 14 and 16 and the blocks 12 and 15 the ends.

The next step is to fill the container thus formed with a composite metal invented by me and which forms the subject matter of a separate application for patent, filed of even date herewith, Serial No. 628,926. Briefly stated, this composite metal comprises a base material composed of small particles or pieces of metal which are self-packing and a void-filling and fusing material also composed of metal. In the preferred embodiment of the invention for the present purpose, the base material comprises mild steel shot 19, such, for example, as are shown in Fig. 4 on a greatly exaggerated scale. Such shot when poured into a container will freely run or flow to every part thereof, the same as ordinary lead shot will fill a container and the aggregate of the voids will be very small. Shot of this character will freely run under the curved surfaces of the pipes and manifolds as well as over them. As an additional precaution, however, to ensure complete filling of the container with the shot it is desirable in some cases to jar the container, as with a pneumatic hammer, for example. After the container is filled with shot to the level of the side plates 8 and 9, the void-filling and fusing material in the form of small pieces of metal is well distributed over the top of the shot. For this purpose boronized copper is used or copper which has been treated in a hydrogen furnace to remove impurities. The copper should be placed on top of the shot as distinguished from being mixed therewith so that when subsequently treated the gases will rise and not be trapped in the voids which would cause displacement of the shot or form pockets in the mass or both and thus render the final product defective to that extent.

The next step is to place the container and its contents in a closed furnace in which a supply of selected gas such as hydrogen is constantly maintained. The temperature of the furnace is then raised to the melting point of the copper which then flows by capillary action into and fills the voids between the shot, and fuses them to the manifolds, to the cross-pipes and to the side plates. Any excess of copper may be carried off by drains which are usually located at the bottom of the container. There is a certain amount of alloyage of the copper and steel parts, thereby appreciably increasing the strength of the product and increasing the thermal conductivity. The sheets of asbestos 10, 14 and 16 protect the steel parts which it is not desired to fuse to the other parts. The copper in addition to filling the voids also flows into and through the joints between the cross-pipes and manifolds, thereby sealing them against the leakage, at the same time fusing them into an integral structure. The copper also flows or spreads over the inner walls of the cross-pipes and manifolds and in this manner protects them from the effects of rust. After the copper has melted it is desirable to rather quickly lower the temperature of the furnace from its highest point to complete the fusing operation after which the temperature may be lowered more gradually, the supply of hydrogen being maintained, however.

By suitable test it has been determined that the strength of my improved composite metal, as above described, has about the same strength as that of mild steel; that it can be worked or machined by similar metods, and that it is dense and homogeneous throughout.

After the treatment in the hydrogen furnace is completed the container is removed and when cooled the plate thus formed is machined top and bottom, and on the ends or on all four sides if desired. The top and bottom or working faces may be ground if specially good surfaces are desired.

The circulating fluid is admitted to and discharged from the manifolds as indicated by the arrows in Fig. 1. For this purpose the projecting ends of the manifolds may be threaded to receive couplings for flexible pipes.

One very important advantage of my improved construction is that it may be made very thin and hence the mass of metal which first has to be heated in the press and then cooled is much less than with prior constructions and consequently the time consumed in the press operations is decreased and a saving in steam and cooling water is effected. For example, but not as a limitation of my invention, the finished plate in some cases need not be more than one-sixteenth of an inch thicker than the outside diameter of the manifolds. This is due to the character of the composite metal employed as a supporting body, and especially to the fact that the steel shot are not only fused to each other but also to the walls of the steel tubes of which the built-up fluid circulating structure is composed. Due to this fusion the thermal conductivity is very greatly superior to those constructions in which a coil of pipe is cast with the plate because in such cast-in construction the two metals only make surface contact at best and frequently pockets are formed between the two which further reduce the transfer of heat. The construction is far cheaper than a solid steel plate with drilled circulating passages, and in large plates may be made much thinner than is practical with said drilled construction because of the difficulty of drilling long, accurately-spaced holes. Furthermore, I can make plates of practically any size and of far greater dimensions than is possible with the drilled construction, for obvious reasons. A further and very substantial advantage of these thin plates resides in the fact that a greater number can be put into a given press at the same time, thereby increasing its output per unit of time.

My invention is also applicable to so-called steam tables which are commonly fixed in position and are used in many operations and which have to be kept at a substantially uniform temperature.

I have described the built-up structure for the circulating medium as composed of steel pipe which I have found to be entirely satisfactory for the purpose, but it is evident that this structure may be built up in other ways without departing from the scope of my invention. Also that the arrangement of the passages in the structure may be varied to suit the requirements for which the plate is intended. It is also evident that the container in which the plate is formed can be made in a variety of ways, and that the boundary wall may be of different shape.

What I claim as new and desire to secure by Letters Patent of the United States, is:—

1. In a device of the character described, the combination of a metal conduit adapted to contain a circulating medium with a support for the conduit comprising a base of self-packing metal particles having voids of a capillary nature and a void filling metal of lower melting point than the base which serves to unite the particles with each other and with the wall of the conduit.

2. In a device of the character described, the combination of a plurality of spaced metal conduits for a circulating medium with a supporting plate in which the conduits are embedded, comprising a base of self-packing metal particles and a void-filling metal which unites said particles with each other and with the walls of the conduits.

3. In a device of the character described, the combination of a plurality of spaced metal conduits, means communicating therewith for supplying a circulating medium, and a supporting plate in which the conduits are embedded, comprising a base of self-packing metal pieces and a void-filling metal which unites said pieces with each other and with the walls of the conduits.

4. In a device of the character described, the combination of a built-up structure comprising a manifold and conduits which communicate therewith, and a supporting plate in which the manifold and conduits are embedded, which comprises a base of self-packing metal pieces having voids of a capillary nature and a metal of lower melting point than the metal pieces which fills said voids and also unites said pieces, manifold and conduits into an integral structure.

5. In a device of the character described, the combination of a built-up structure comprising a pair of manifolds, spaced conduits, the ends of which are seated in the manifolds, and a supporting plate in which the manifolds and conduits are embedded in spaced relation to the top and bottom surfaces of the plate, said plate comprising a mass of self-packing metal particles having voids of a capillary nature and a metal of lower melting point than the metal particles which fills the voids and unites said pieces, manifolds and conduits into an integral structure.

6. In a device of the character described, the combination of steel conduits arranged to form a fluid-circulating system, with a plate in which said conduits are embedded and in spaced relation to the top and bottom surfaces thereof, said plate comprising a mass of steel shot and copper in sufficient amount to fill the voids between said shot, said copper uniting the shot with each other and with the walls of the conduits.

7. In a device of the character described, the combination of a pair of manifolds, a plurality of conduits arranged side by side, the ends of which enter the conduits, and a plate in which the manifolds and conduits are embedded and held in spaced relation to the top and bottom surfaces of the plate, said plate comprising a mass of steel shot having voids of a capillary nature and copper in sufficient amount to fill the voids, said copper uniting the shot with each other and with the walls of the manifold and conduits.

8. In a device of the character described, the combination of a manifold which has a series of openings along one side, a plurality of conduits having ends which fit friction-tight in said openings, and a plate in which the manifold and conduits are embedded which comprises a mass of self-packing particles of metal and an added metal which fills the voids between said particles and unites the particles with each other, with the walls of the manifold and conduits and also fills the joints between and unites said last-named parts.

9. In a device of the character described, the combination of a pair of manifolds arranged side by side with openings in their opposed faces, conduits, the ends of which enter the manifolds and are cut away to conform to the shape of the inner walls of the manifolds, side plates in which the ends of the manifolds are supported, and a plate in which the manifolds and conduits are embedded which comprises a mass of self-packing metal particles having voids of a capillary nature and copper which fills the voids and unites the parts into an integral structure.

10. In a device of the character described, the combination of a metal conduit adapted to contain a circulating medium with a support in which the conduit is enveloped comprising a base of packed metal particles having voids of a capillary nature and a metal of lower melting point than the particles which fills the voids and so intimately unites the particles that the support has greater strength than said metal of lower melting point.

In witness whereof, I have hereunto set my hand this 29th day of March 1923.

CHRISTIAN STEENSTRUP.